2,820,735
SEALING OF POLYMERIC LINEAR TEREPHTHALATE ESTER STRUCTURES

Leonard Edward Amborski, Buffalo, N. Y., assignor to E. I. du Pont de Nemours and Company, Wilmington, Del., a corporation of Delaware No Drawing. Application July 8, 1955
Serial No. 520,908

5 Claims. (Cl. 154—139)

This invention relates to the bonding of polymeric linear terephthalate ester structures, and more particularly, to a process of sealing polyethylene terephthalate films to themselves through the agency of a solvent.

Films of polyethylene terephthalate and like polymeric linear terephthalate esters which have been oriented, e. g., stretched or rolled in two directions and heat-set, find use in a variety of applications, e. g., packaging, protective coverings, glass replacements, etc. Heretofore, use of such films, however, had been greatly restricted in applications requiring the heat-sealing of the film. When it is attempted to heat-seal or bond together through the agency of heat alone, an oriented polyethylene terephthalate film, the film shrinks or retracts in the heated area and the heat-seal is usually puckered, may be brittle, and/or opaque, and is liable to tear at the seal as it shrinks. Furthermore, it is necessary to employ, even to effect an unsatisfactory seal between layers of oriented film, temperatures far above normal heat-sealing temperatures employed in sealing unoriented thermoplastic films. For example, whereas unstretched polyethylene terephthalate film is heat-sealable at temperatures from 150°–170° C., it is necessary to employ heat-sealing temperatures within a range of from 235°–245° C. to seal oriented polyethylene terephthalate film which has been stretched three times (3×) in both directions and heat-set (i. e., subjected to heat from 150°–200° C. while under tension).

It is an object of the present invention, therefore, to provide a process for the satisfactory sealing of oriented, polymeric, linear, terephthalate ester structures to themselves. It is a further object of the present invention to provide a process for the sealing of oriented, polyethylene terephthalate structures to themselves or like structures. A still further object is to provide a process for sealing together oriented, polyethylene terephthalate films.

These objects are realized by the present invention which, briefly stated, comprises uniting oriented, polymeric, linear, terephthalate ester structures, e. g., film, by applying benzyl alcohol over the area of juncture of at least one of the two surfaces to be united and thereafter joining the structures together over this area by the application of heat, at a temperature of at least 140° C., and pressure.

The preferred subject for treatment in accordance with the process of this invention is oriented, balanced (equivalent mechanical properties in both longitudinal and transverse directions), heat-set polyethylene terephthalate film, and particularly polyethylene terephthalate film which has been drawn to substantially the same extent in both the longitudinal (machine) direction and transverse direction of the film, and thereafter heat-set by known expedients. It is to be understood, however, that the present invention comprehends the treatment of films and other structures, e. g., fabrics, ribbons, plates, etc., of any synthetic polymeric, linear, terephthalate esters prepared by reacting a glycol selected from the series $HO(CH_2)_nOH$ wherein "$n$" is an integer from 2–10, inclusive, terephthalic acid or low molecular weight esters thereof, and from 0–20% by weight of a second acid or ester thereof; the second acid being selected from such acids as isophthalic acid, dibenzoic acid, hexahydroterephthalic acid, adipic acid, sebacic acid, azelaic acid, naphthalic acid, 2,5,dimethyl-terephthalic acid and bis-2-carboxy-phenoxy ethane.

The present invention resides in the discovery that an effective, undistorted heat-seal for polymeric terephthalate film can be obtained at practical working temperatures by the use of benzyl alcohol as a solvent applied to the film surface before pressing. Benzyl alcohol has been found not only to possess the unusual property of giving strong heat-seals between the surfaces of oriented, linear, polyester structures, but also has a satisfactorily low toxicity, high boiling point, low vapor pressure and ease of application. Its low toxicity makes it possible to use this method of sealing in the manufacture of containers and overwraps for foods and drugs. Its high boiling point (205° C.) and low vapor pressure eliminates any working hazards because of fumes and prevents any viscosity control problem due to excess evaporation.

The preferred method for carrying out the process of the present invention is to apply benzyl alcohol onto the film over the desired area with a cloth or wick dampened with the solvent. It is desirable that a minimum amount of the solvent be used. The application of excessive amounts of solvent may result in the puckering or shrinking of the film upon being heat-sealed. The benzyl alcohol may be diluted with a diluent such as ethanol. Low concentrations of benzyl alcohol, however, give reduced heat-seal bond strengths. After the benzyl alcohol is applied over the area(s) of the film to be sealed, the films are brought together and the seal made with a precision heat-sealer or any other conventional heat-healing apparatus. The sealing pressure and dwell time will be dependent upon the material used, the thickness of the film, and the temperature at which the sealing process is being carried out. A pressure of 20 lbs. per sq. inch and a dwell time of 2 seconds was found to be very satisfactory in carrying out the examples to be illustrated hereinafter.

The sealing temperature may range from 140°–215° C. Desirably good results were obtained using temperatures of 160°–180° C. Temperatures below 140° C. gave seals of low strength, while temperatures in excess of 200° C. tended to give distorted seals.

The following specific examples further illustrate the principles and practice of my invention.

In the following examples, amorphous polyethylene terephthalate film was prepared in accordance with the general procedure described in U. S. Patent No. 2,465,314, issued to Whinfield and Dickson. The amorphous film was oriented by stretching 3× in both directions in accordance with the method for "Stretching of Polyethylene Terephthalate Film" disclosed in copending application of Arthur C. Scarlett, U. S. Serial No. 287,354, filed May 12, 1952, and heat-set while being held under tension at 200° C.

In each of the examples, biaxially-oriented, heat-set, polyethylene terephthalate film, prepared as above described, was cut into strips 1½" wide. A portion of one face of a strip was wetted with a thin film of benzyl alcohol and another strip was laid thereon and a seal made across the width of the superposed strips, and over the benzyl alcohol-wetted area, using a precision-type heat-sealer, the sealing bar of which measured ¾" in width and 3¾" in length. The sealing pressure in every instance was 20 pounds per square inch. Heat-seal peel strengths were measured on a conventional Suter tester in the manner prescribed in Ubben, U. S. Patent No. 2,147,180, i. e., by opening the sealed strips at the free ends; gripping one free end in the stationary clamp, and the other free end in the movable clamp of the tester and moving the clamps apart at a constant speed of 12" per minute. The highest force (in grams) required to pull the film apart is taken as the peel strength and hence as a measure of the heat-seal bond strength. Heat-seal shear strengths, which are also a measure of the strength of the heat-seal bonds, were measured in a Scott tester by gripping the free ends of the sealed strips in the two vertically-aligned clamps of the tester and pulling the lower clamp away from the upper clamp. The force required to shear the sealed strips apart is calibrated in pounds per square inch. The effectiveness of the seal, made under the indicated conditions, is set forth in the following table.

*Table*

| Ex. | Film thickness (mils) | Sealing temperature (° C.) | Dwell time (seconds) | Heat-seal bond strength | |
|---|---|---|---|---|---|
| | | | | Peel (grms.) | Shear (lbs./sq. in.) |
| 1 | 2 | 165 | 2 | 1,030 | 54.5 |
| 2 | 2 | 175 | 2 | 1,420 | 56.2 |
| 3 | 2 | 190 | 2 | 1,470 | 54.0 |
| 4 | 1 | 150 | 2 | 675 | 30.6 |
| 5 | 1 | 175 | 2 | 960 | 27.4 |
| 6 | 1 | 190 | 2 | 1,070 | 26.6 |
| 7 | 0.5 | 150 | 2 | 325 | 16.0 |
| 8 | 0.5 | 165 | 2 | 390 | 14.8 |
| 9 | 0.5 | 175 | 2 | 500 | 14.3 |
| 10 | 1 | 175 | 0.25 | 725 | |
| 11 | 1 | 175 | 0.5 | 930 | |
| 12 | 1 | 175 | 1 | 965 | |
| 13 | 1 | 175 | 2 | 970 | |

Because of the special need which has existed for a method for heat-sealing oriented, heat-set, linear, polymeric terephthalate structures, particular emphasis has been placed on the use of these structures in the description given for the process of the present invention hereinbefore. It is to be understood, however, that unoriented, amorphous, linear, polymeric terephthalate ester structures may also be advantageously treated by this process.

From the foregoing, it is apparent that the process of the present invention affords a simple, efficient method for heat-sealing oriented, polyethylene terephthalate film, which is an especially promising candidate for such end uses as the prepackaging of meats, frozen food packaging, bags, containers, drum and container linings, and as overwraps for such commodities as blankets and sheets. The employment of benzyl alcohol, a non-toxic, easily applicable, non-hazardous, efficient solvent, in combination with moderate pressures and temperatures, produces heat-seal bonds with oriented, linear polyester film, which, heretofore, have not been obtainable by any method of heat-sealing now known.

I claim:
1. A process for uniting polymeric linear terephthalate ester structures which comprises applying benzyl alcohol over the area of juncture of at least one of the two surfaces to be united, bringing said surfaces together, and thereafter applying pressure and heat at a temperature of at least 140° C. over the area of juncture.

2. A process for uniting polyethylene terephthalate film surfaces which comprises applying benzyl alcohol over the area of juncture of at least one of the two surfaces to be united, bringing said surfaces together, and thereafter applying pressure and heat at a temperature of at least 140° C. over the area of juncture.

3. The process of claim 2 wherein the film is biaxially-oriented, heat-set, polyethylene terephthalate film.

4. The process of claim 2 wherein the temperature is within the range of from 140° to 215° C.

5. The process of claim 4 wherein the film is biaxially-oriented, heat-set, polyethylene terephthalate film.

References Cited in the file of this patent

UNITED STATES PATENTS

| | | |
|---|---|---|
| 2,173,821 | Anderson | Sept. 26, 1939 |
| 2,343,975 | Hosfield | Mar. 14, 1944 |
| 2,673,826 | Ness | Mar. 30, 1954 |
| 2,676,128 | Piccard | Apr. 20, 1954 |